Sept. 10, 1940.    J. D. WALKER    2,214,188
ROTARY DISTRIBUTOR
Filed April 5, 1937    3 Sheets-Sheet 1
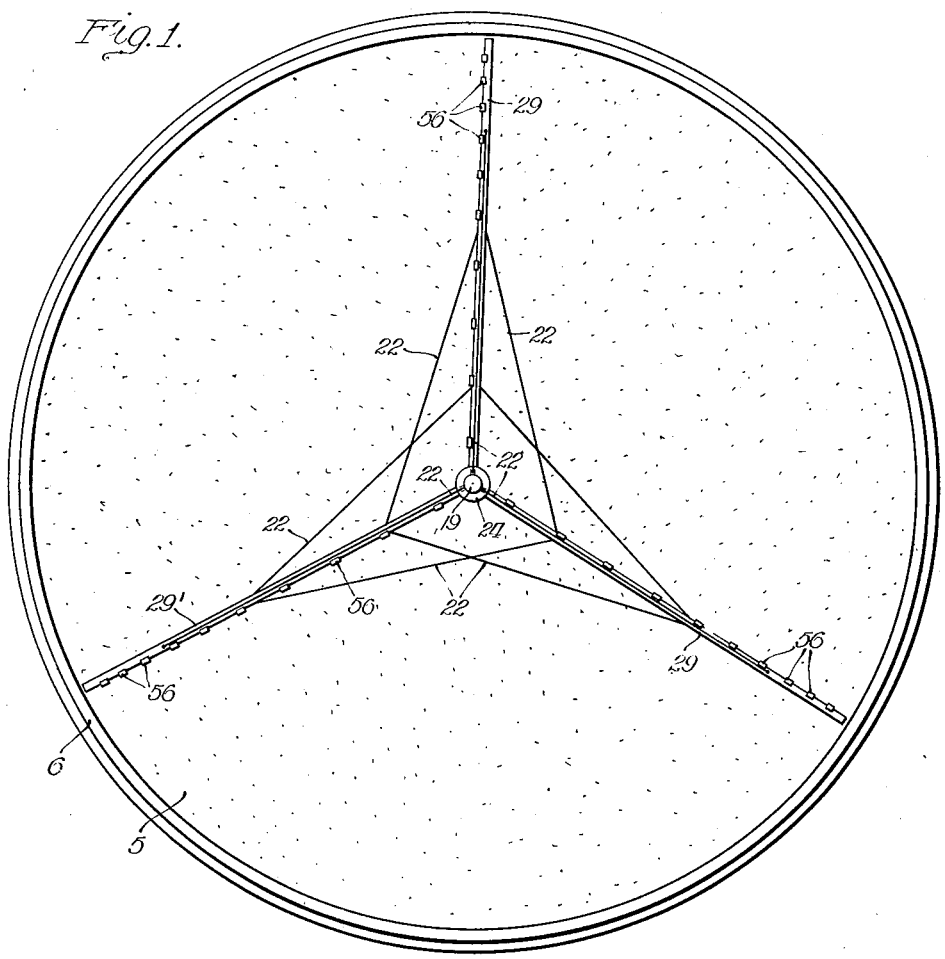
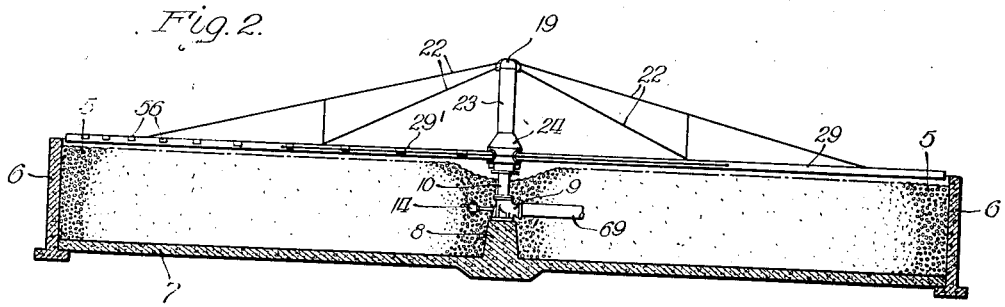
Inventor:
James D. Walker
By: Brown Jackson Boettcher Dienner
Attys.

Sept. 10, 1940.   J. D. WALKER   2,214,188
ROTARY DISTRIBUTOR
Filed April 5, 1937   3 Sheets-Sheet 2
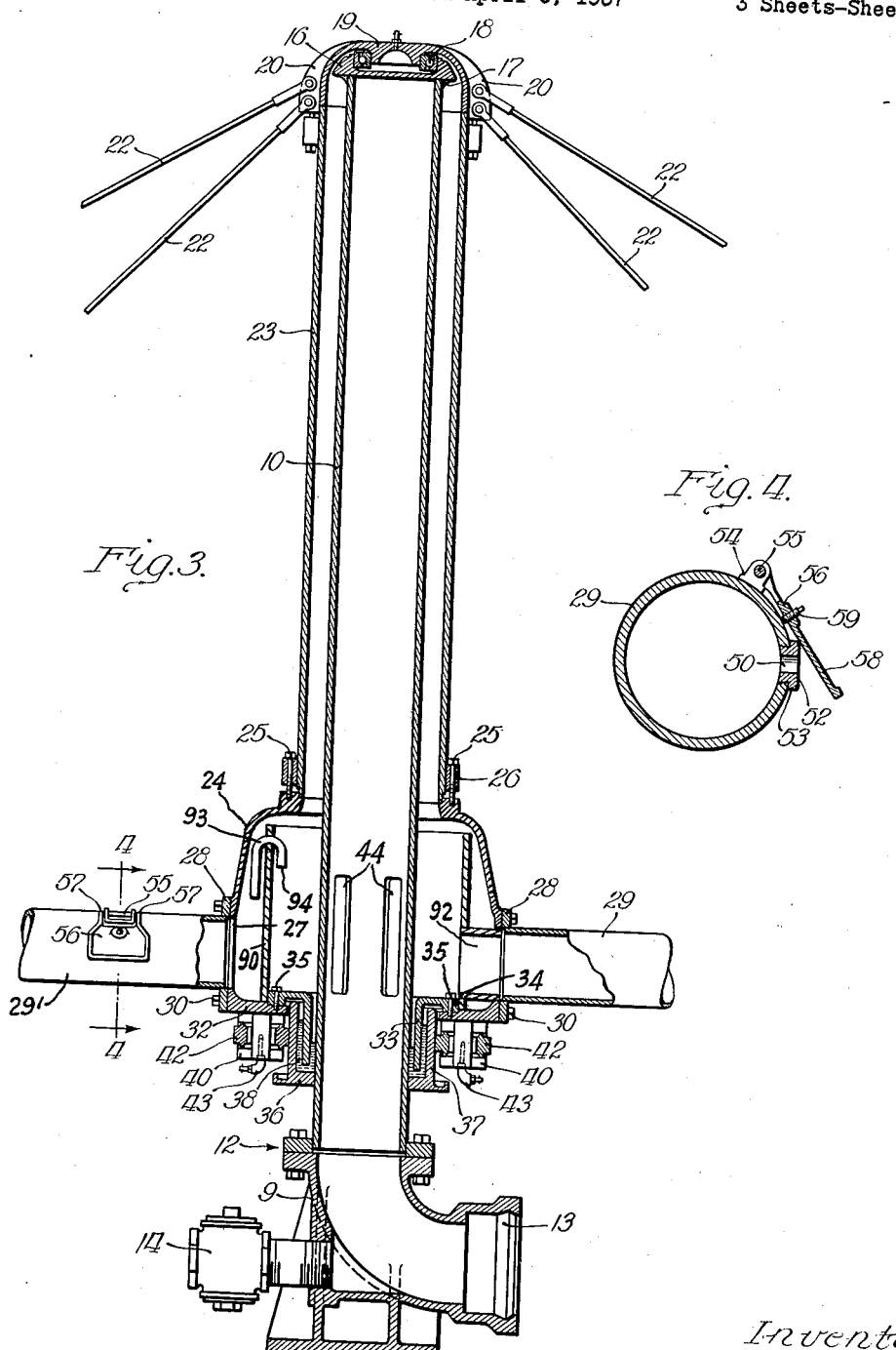
Inventor:
James D. Walker
By: Brown Jackson Boettcher Dienner
Attys.

Sept. 10, 1940.    J. D. WALKER    2,214,188
ROTARY DISTRIBUTOR
Filed April 5, 1937    3 Sheets-Sheet 3
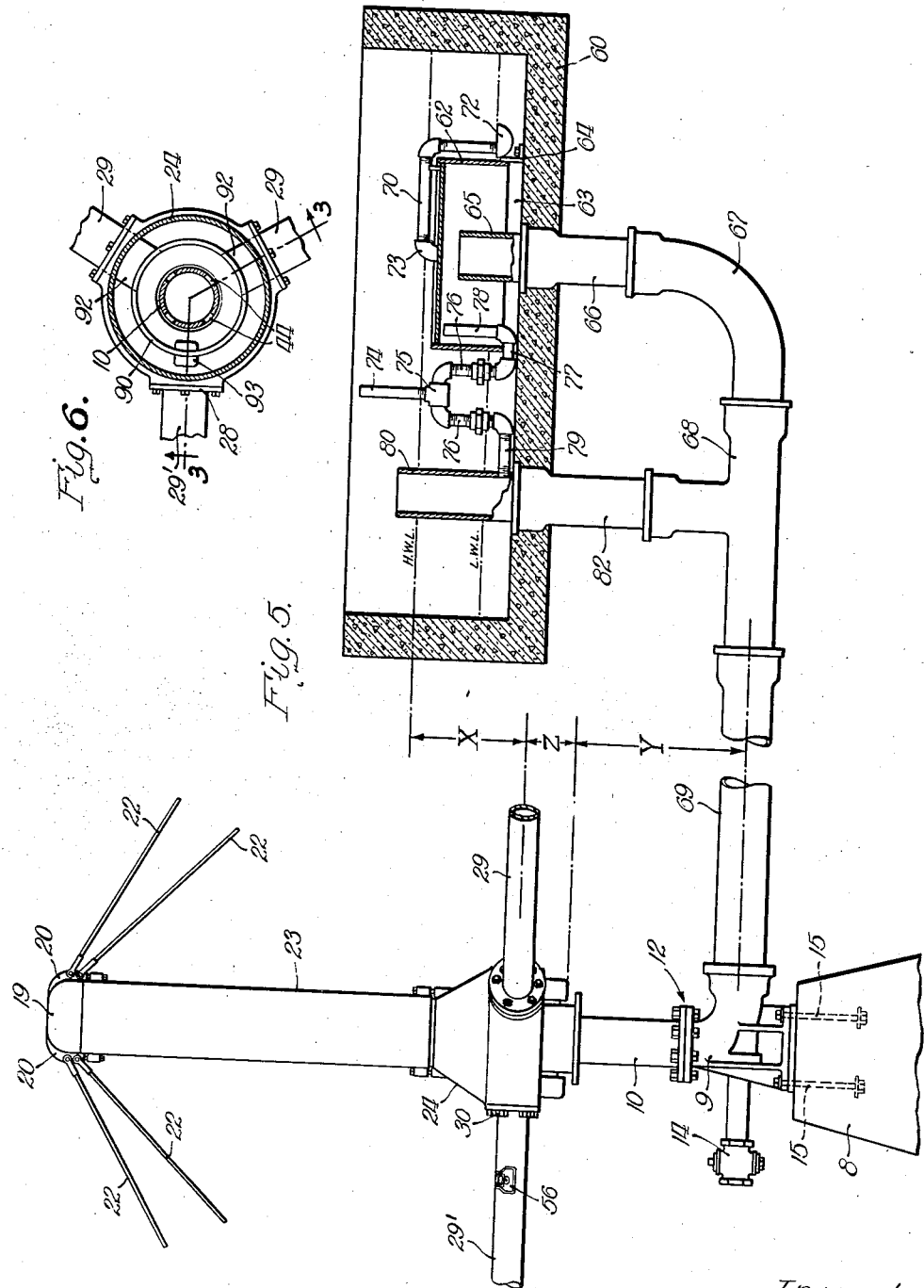
Inventor:
James D. Walker
By: [signature]
Attys.

Patented Sept. 10, 1940

2,214,188

UNITED STATES PATENT OFFICE 2,214,188

ROTARY DISTRIBUTOR

James D. Walker, Aurora, Ill., assignor to The American Well Works, Aurora, Ill., a corporation of Illinois Application April 5, 1937, Serial No. 135,086

7 Claims. (Cl. 299—69)

This invention relates to rotary distributors, and more particularly is directed to rotary distributors employed for spreading liquor uniformly over a circular trickling filter bed.

In the development of sewage disposal plants, one type of disposal system comprises the distribution of sewage in a substantially uniform sheet over the area of a filter bed. The sewage, as it trickles through the interstices in the filter medium, is acted upon by biological life or bacteria which form a surface or film over the individual filter particles, and the sewage emerges from the bottom of the filter bed in a stabilized and oxidized condition.

Distributors of the type now in use with which I am familiar are almost entirely of the reaction type, that is, the reaction of the liquor emerging through orifices or jets in the distributor arms produces rotation of the distributor. This includes the provision of a dosing tank to store up sufficient liquor so that when it is introduced into the distributor, it will, upon emergence from the jets or orifices, produce a sufficient reaction impulse to effect rotation of the distributor. The operation of a distributor of this type is therefore intermittent, and is dependent upon the head and volume of liquor at the distributor. The present invention contemplates broadly an improved rotary distributor of the reaction type, having certain principles of construction and operation such as to improve the operating characteristics thereof and to insure that proper distribution of the liquor over the area of the filter bed is produced.

Such distributors are usually of a form having a central rotating drum or supporting portion mounted upon a feed column or the like, and provided with radially extending arms adapted to sweep over the surface of the filtering bed upon rotation of the drum to distribute the liquor thereover. The present invention contemplates a structure having three arms arranged uniformly with respect to the drum—that is, spaced 120 degrees apart—whereby the action of wind or the like upon the surfaces of the arms will not produce any tendency toward stopping rotation, since the pressures will be balanced so that the distributor is not subjected to rotating effects produced by gusts of wind or the like.

It is the principal object of the present invention to provide a manifold siphon arrangement in the rotating drum of the distributor which will prevent any short circuiting of the filter bed due to lack of sufficient initial starting reaction. This is accomplished by preventing flow of liquor to one of the arms until such time as the other arms are discharging at full pressure, and then siphoning over liquor from the manifold to the one arm in sufficient quantity so that a full discharge along the entire length of the arm is provided.

Still another advantage of the present invention resides in the provision of a structure which is relatively simple in design, economical to manufacture, and may be easily assembled and installed without appreciable expense.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a top plan view of a distributor of the present type, mounted in position over a filter bed;

Figure 2 is a view partly in section, showing the construction illustrated in Figure 1;

Figure 3 is an enlarged sectional view through the supporting column and rotating drum assembly of the distributor, corresponding to a section taken on the plane of the line 3—3 of Figure 6;

Figure 4 is a vertical sectional view taken substantially on line 4—4 of Figure 3;

Figure 5 is a view somewhat diagrammatic, illustrating the operation of the distributor in connection with a syphon and dosing tank; and Figure 6 is a horizontal sectional view of the manifold construction.

Referring now in more detail to the drawings, I have provided a filter bed 5 enclosed within a cylindrical supporting tank 6 having the base 7. The tank 6 and base 7 are preferably formed of concrete reenforced by suitable structural steel, and form a cylindrical enclosure for the filtering material 5. This filter bed is preferably of uniform height, and is composed of relatively hard rocks, which rocks are of a size such that, in a preferred embodiment of the invention, they pass a two-inch screen but are retained upon a one-inch screen. The rock is carefully selected for hardness, and the individual particles thereof, when piled into the bed 5, provide a plurality of interstices therebetween through which the sewage liquor trickles as it is discharged from the rotary distributor.

The base of the tank containing the filter bed 5 is provided at the central portion thereof with a reenforced supporting pedestal 8, upon which is mounted the fitting 9 forming the base of the supporting column, the column itself being indicated generally at 10 and extending vertically up from the fitting 9, being secured thereto by means of the flange connection shown at 12. The fitting 9 is provided with an inlet 13 for receiving sewage liquor entering into the distributor, and is also provided with the clean out drain fitting 14 tapped into the base thereof. Suitable bolts indicated at 15 in Figure 5 serve to clamp the fitting 9 firmly to the pedestal 8, to insure that the column 10 will be supported in strictly vertical position thereon.

At its upper end, the column 10 is provided with the thrust plate 16, welded or otherwise suitably secured thereto as indicated at 17, which thrust plate is provided on its upper surface with a suitable recess portion adapted to receive the ball-bearing thrust member 18, which is engaged by the dome-shaped portion 19 of the rotating drum. The dome portion 19 of the drum is provided with suitable gusset extensions 20 to which are secured the truss members 22 which serve as suitable supporting braces and struts forming the truss structure for supporting the extending arms of the distributor. Secured below the dome-shaped cap 19 is the cylindrical sleeve member 23, which is disposed substantially coaxial with the supporting column 10 and is spaced therefrom to provide an annular cylindrical space therebetween.

At its lower end the sleeve member 23 is joined to a distributor manifold 24, being clamped rigidly thereto by a series of bolts 25 carried by the flange 26 welded or otherwise suitably secured to the lower end of the sleeve member 23. The manifold 24 is provided with the circumferentially spaced outlet ports 27, three in number in the preferred embodiment of the invention, which are defined by flange faces adapted to be engaged by suitable flanges 28 carried at the inner ends of the distributor arms 29, 29 and 29'. The flanges 28 are secured to the flange faces of the manifold opening by suitable bolts 30, as indicated clearly in Figure 3. As hereinafter described, the distributor arm 29' terminates at the coupling flange 28, whereas the other two distributor arms 29, 29 communicate through coupling extensions 92 with the cylindrical interior of an annular partition 90.

The manifold 24 is provided with a lower flange base portion 32 apertured to provide some clearance with respect to the column 10, and adapted to carry the cylindrical sleeve member 33, having the peripheral flange portion 34 bolted to the inner face of the base 32 by means of the bolts 35. The sleeve portion 33 extends downwardly in radially spaced relationship to the supporting column 10, and a suitable sealing flange member 36, secured to the periphery of the column 10, is provided with the upwardly extending cylindrical portion 37 which is spaced radially outwardly of the sleeve 33. The sleeve 33 therefore forms a division in the annular space between the flange 37 and the column 10, and provides, in effect, means for forming a mercury seal between the interior of the manifold 24 and the filter bed and supporting column. The mercury forming this seal is indicated generally at 38, and due to the pressure within the distributor manifold, stands at approximately the level shown during normal operation. In order to center the drum 23 with respect to the central supporting column, the base portion 32 of the distributor manifold is provided with suitable bearing supporting means 40, containing the roller-bearing members 42 adapted to have rolling engagement with the external surface of the sleeve portion 37 of the sealing member 36. Suitable lubricant fittings 43 are provided for effecting lubrication of these bearings. Preferably a plurality of such bearings are provided about the periphery of the member 36, and serve to support the side thrusts of the distributor upon its rotation with respect to the column 10.

The column 10 is provided, in the portion thereof which is enclosed within the distributor manifold 24, with a plurality of longitudinal slots 44, which slots allow the passage of liquor from the inlet 13 of the fitting 9 up through the column 10, and outwardly into the interior of the annular partition 90, from whence the liquor flows radially outwardly through the coupling extensions 92 into the two radially extending arms 29. The flow into the third arm 29' occurs through a siphon passageway 93, which will be later described. The mercury seal 38 prevents any escape of this liquor downwardly along the external surface of the column 10 and outwardly through the lower end of the base member, the seal shutting off such flow while at the same time providing for relative rotation of the sleeve member 33 with respect to the member 36 and the column 10.

Considering now the arms 29 in detail, it will be noted that each of the arms is provided, along one lateral face thereof, with a series of orifices 50 each provided with a threaded bushing 52, the bushings 52 being provided with a flange portion 53 limiting the extent to which the bushings may be threaded into the orifices 50, so that the inner edge of the bushing 52 lies substantially flush with the inner periphery of the arm 29. Suitable hinge brackets 54 are secured to the arms at points corresponding with the location of the orifices 50, and are provided with suitable hinge pins 55 for supporting the deflector or baffle plate 56 for pivoted movement with respect thereto. The plate 56 is provided with two extending ear portions 57, as indicated in Figure 3, which are engaged by the pins 55, and is provided with a flat planar portion 58 adapted to be disposed angularly over the bushing 52 and orifice 50. A suitable threaded stud 59 extends normal to the plane of the plate 56, and is adapted to engage the periphery of the arm 29 for adjusting the angular position of the plate 56 with respect to the orifice and the bushing. Upon flow of liquor outwardly through the orifice 50, the liquor engages the undersurface of the plate 58, and is thereby spread out into a thin sheet, which falls from the lower edge of the plate surface 58 onto the filter bed. The disposition of the orifices is such that the spreading out of the sheets from each of the orifices produces a substantially uniform sheet of liquor flowing from the arm onto the surface of the filter bed.

Because of the fact that the hydraulic head in the arm itself drops as the liquor travels outwardly toward the outer end of the arm, the orifices are preferably varied in spacing, being spaced relatively far apart adjacent the inner end of the arm, due to the fact that the liquor issuing from the jets issues under a greater hydraulic head, and consequently more liquor is discharged through these orifices and spreads over a wider surface. As the hydraulic head falls toward the outer ends of the arms, the orifices are spaced closer together, in order that decreased flow will still produce a substantial confluence of the respective sheets from the plates 56, in order to provide for uniform distribution of the liquor over the entire filter bed.

This control of discharge may also be effected by controlling the sizes of the orifices, that is, providing relatively larger orifices at points of lower hydraulic head.

Considering now in detail the structure shown in Figure 5, which will indicate the manner in which the present distributor is operated, there is provided a dosage tank 60, which tank may be formed of concrete or the like, and which is supplied with sewage liquor from any suitable source. The tank 60 is preferably so disposed with respect to the axial position of the arms 29, as indicated by the dimension X, to insure that a sufficient hydraulic head will be provided to produce rotation of the distributor due to the reaction of the liquor spurting through the orifices 50 against the plates 56. The tank is also preferably so disposed with respect to the inlet fitting 9, as indicated by the dimension Y added to the dimension X plus the height of the distributor arms above the surface of the filter bed as indicated by the dimension Z, to insure a ready flow of liquor from the tank through the conduit system and into the central supporting column 10 for entrance into the distributor manifold 24.

The dosage tank 60 is provided with a siphon chamber, indicated at 62, having a closed top and being spaced slightly away from the bottom of the tank 60 as indicated at 63 by suitable angle support members 64. Extending upwardly into the chamber 62, and open adjacent the top thereof, is the inlet conduit 65, which is connected thru conduits 66, 67, 68 and 69 to the inlet 13 of the fitting 9 supporting the rotary distributor. A suitable siphon connection, indicated at 70, is provided, having a low water inlet port 72, and opening into the upper end of the chamber 62 through the elbow 73.

The dosing tank is also provided with a suitable bleed structure comprising the conduit 74 opening above the surface of liquor in the tank, and joined through the fitting 75 to two downwardly extending legs 76, one of the legs 76 being connected through the fitting 77 to an upwardly extending arm 78 projected up to adjacent the top of the siphon chamber 62. The other arm 76 is connected through the pipe 79 to the overflow conduit 80 which is connected through the fitting 82 to the conduit 68 and thence to the inlet 13 of the distributor.

In operation, the sewage liquor introduced into the tank 60 produces an air pressure within the chamber 62, which is effective to place a considerable air pressure upon the upper end of the pipe 78. The U formed by the members 76, 77 and 78, is filled with liquor, and as the pressure at the upper end of the pipe 78 increases, this liquor is forced through the U and across the fitting 75, and rushes through the opposite leg 76 and conduit 79 into the overflow conduit. The release of pressure within the chamber 62 by the exhaust or bleed through this connection decreases the pressure within this chamber to an extent such that the liquor therein rises above the surface of the inlet conduit 65, and liquor flows thence into the distributors, entering the manifold 24 through the slots 44 in the central column 10. As long as the liquor level remains above the port level 72 in the tank 60, liquor will continue to flow through the conduits 65 to 69, inclusive, into the distributor. The overflow conduit is provided for insuring that the system will not allow overflow of the tank 60, since if the liquor reaches a point above the high water level, the liquor is immediately transferred to the distributor through the overflow conduit. As the liquor moves downwardly about the outside of the chamber 62 to a point below the upper end of the outlet 65, a siphon effect is produced which continues to allow liquor to flow through the pipe 65 until the level reaches the opening or port 72 of the siphon arm 70. When the liquor drops below this level, air is introduced through the fitting 70 into the interior of the chamber 62, and immediately breaks the siphon to prevent further flow of liquor through the distributor inlet 13. It is then necessary that the liquor within the tank 60 rise to a level indicated by the high water level indication in the tank before the system can become operative. This produces intermittent operation of the distributor, the distributor never being operated when the head thereon is such that a sufficient reaction effect cannot be produced to insure rotation of the distributor, in order to prevent short-circuit of a portion of the filter bed.

Referring now in detail to my improved manifold siphon arrangement, it will be seen that within the manifold 24 I provide an annular partition 90 into which the ends of two of the arms 29 are projected by means of coupling extensions 92 (Figure 6). Thus the discharge from the feed column 10 through the outlets 44 is restrained within the partition 90 and can be discharged only through the extensions 92 to the two arms 29. As a result, the initial discharge pressure in these arms is greater than in constructions where the initial flow occurs immediately to all of the arms of the distributor, with the result that in my improved construction the reaction from the jets produces a greater acceleration during initial rotation of the distributor. However, the rate of liquor discharge from the two arms 29 in this manner is less than the rate of flow into the manifold from the feed column and, as a result, the level of liquor within the partition member 90 rises.

The external surface of the partition member 90 defines with the manifold 24 an external annular duct which communicates only with the arm 29'. A suitable siphoning member 93 is supported by the partition member 90 in position adjacent the inlet end of arm 29'. As the level of liquor within the partition member 90 rises above the horizontal plane passing through the tops of arms 29, it approaches the inlet end 94 of siphoning member 93. When the level has risen to a point equal to the highest point of the siphoning member, the liquor will flow through this member into the inlet of arm 29' at a rate sufficient to insure discharge thereof throughout the length of the arm 29'. Since the liquor from the dosing tank 60 is flowing into the manifold at a rate greater than the rate of discharge through the two arms 29, the additional liquor will be continuously siphoned by member 93 into the arm 29' during operation of the distributor. The siphon insures that when flow is initiated into arm 29' such will be a surge flow of sufficient volume to carry the liquor substantially out to the outer end of the arm 29', thereby avoiding objectionable concentration of discharge from the orifices at the inner end of said arm.

This improved construction thus prevents a flow of liquor from the arms which is insufficient initially to produce any effective acceleration of rotation and which is not of sufficient quantity to reach the outer ends of the arms. Thus uniform distribution of the liquor over the surface of the filter bed is assured.

I am aware that various changes may be made in certain details of the present construction, and I therefore do not intend to be limited except as defined by the scope and spirit of the appended claims. For example, while I prefer to employ three distributing arms 29, 29 and 29', my improved manifold siphon arrangement 90—93 can be employed with advantage in two-arm or four-arm constructions.

I claim:

1. In a distributor of the reaction type, a central manifold, a plurality of radially extending arms connected therewith, means for supplying liquor to said manifold, and means in said manifold preventing flow of said liquor to one of said arms until other of said arms are discharging at their maximum capacity and including a siphon operable thereafter to produce flow to said one arm sufficient to effect uniform discharge therefrom throughout its length.

2. In a rotary distributor, the combination of a rotating unit comprising an outwardly extending distributing member, supply means for supplying liquid to said distributing member, and a siphon carried by said rotating unit and operatively connected with said supply means and with said distributing member for controlling the flow to said distributing member.

3. In a rotary distributor, the combination of a rotating unit comprising an outwardly extending distributing member, a pair of chambers carried by said rotating unit and open at their upper ends to atmosphere, means for supplying liquid to one of said chambers, the other chamber discharging to said outwardly extending distributing member, and a siphon passage connecting said chambers.

4. In a rotary distributor, the combination of a rotating unit comprising an outwardly extending distributing member, inner and outer chambers carried by said rotating unit and having their upper ends open to atmosphere, means for supplying liquid to said inner chamber, said outer chamber discharging to said distributing member, and a siphon passage having a short leg communicating with said inner chamber and a long leg communicating with said outer chamber.

5. In a rotary sewage distributor, the combination of a rotating hub, a plurality of distributing arms extending outwardly from said hub, a manifold chamber in said hub, means for supplying sewage liquid to said manifold chamber, one of said arms receiving said liquid directly from said manifold chamber, a secondary chamber communicating with another of said distributing arms, and a siphon connection from said manifold chamber to said secondary chamber.

6. In a rotary distributor, the combination of a rotating unit comprising an outwardly extending distributing member, and mechanism for supplying liquid to said distributing member comprising siphon means carried by said rotating unit for establishing a surge flow to said distributing member.

7. In a rotary distributor, the combination of a rotating unit comprising a plurality of outwardly extending distributing members, means for supplying a substantially steady flow of liquid to one of said distributing members, and siphon means for establishing a surge flow of liquid to another of said distributing members.

JAMES D. WALKER.